(12) United States Patent
Burger et al.

(10) Patent No.: US 7,246,912 B2
(45) Date of Patent: Jul. 24, 2007

(54) ELECTROLUMINESCENT LIGHTING SYSTEM

(75) Inventors: Victor Burger, Blaustein (DE); Bartholomeus Gerardus Gosewinus Van Walstijn, Gentofte (DK)

(73) Assignee: Nokia Corporation, Espoo (FI)

( * ) Notice: Subject to any disclaimer, the term of this patent is extended or adjusted under 35 U.S.C. 154(b) by 71 days.

(21) Appl. No.: 10/678,350

(22) Filed: Oct. 3, 2003

(65) Prior Publication Data

US 2005/0073829 A1  Apr. 7, 2005

(51) Int. Cl.
*F21V 9/16* (2006.01)
*G09G 3/10* (2006.01)

(52) U.S. Cl. .................. 362/84; 315/169.3; 315/169.1; 313/506

(58) Field of Classification Search .................. 362/84, 362/34, 173, 20; 313/463, 502–504, 506, 313/498; 349/69; 315/169.3, 169.1, 169.2, 315/169.4; 345/76, 77, 82, 102
See application file for complete search history.

(56) References Cited

U.S. PATENT DOCUMENTS

| | | | |
|---|---|---|---|
| 2,992,351 A * | 7/1961 | Van Den Houten et al. | 313/509 |
| 4,237,456 A | 12/1980 | Kanatani | 340/719 |
| 4,611,150 A | 9/1986 | Ball et al. | 315/307 |
| 4,741,976 A * | 5/1988 | Eguchi et al. | 428/690 |
| 5,286,517 A * | 2/1994 | Kahng et al. | 313/503 |
| 5,517,089 A | 5/1996 | Ravid | 315/307 |
| 5,532,553 A | 7/1996 | Flory, IV | 315/169.3 |
| 5,648,181 A | 7/1997 | Watanabe | 428/689 |
| 5,789,870 A | 8/1998 | Remson | 315/194 |
| 5,805,124 A * | 9/1998 | Kapoor et al. | 345/76 |
| 5,861,719 A | 1/1999 | Koskowich et al. | 315/209 R |
| 6,144,165 A | 11/2000 | Liedenbaum | 315/169.3 |
| 6,198,226 B1 | 3/2001 | Koskuba, Jr. | 315/169.3 |
| 6,248,261 B1 | 6/2001 | Takemura et al. | 252/301.6 S |
| 6,528,941 B1 | 3/2003 | Inubushi et al. | 313/506 |
| 6,563,271 B1 * | 5/2003 | Mussenden | 315/169.3 |
| 2003/0117421 A1 | 6/2003 | Cheng | 345/690 |

FOREIGN PATENT DOCUMENTS

| | | |
|---|---|---|
| WO | WO 01/27735 A1 | 4/2001 |
| WO | WO 03/056538 | 7/2003 |

* cited by examiner

*Primary Examiner*—Sandra O'Shea
*Assistant Examiner*—Bao Q. Truong
(74) *Attorney, Agent, or Firm*—Perman & Green, LLP

(57) ABSTRACT

Electroluminescent panels for use in battery operated devices include a driver circuit and a plurality of panel regions having a capacitance. Each panel region has a substitute capacitor with a capacitance substantially equal to the capacitance of the panel region concerned. The driver circuit switches between the panel region and the substitute capacitor, switching the panel region on and off. The capacitance of the load on the driver circuit does not change. The electroluminescent panels can have an elimination layer that eliminates noise produced by the emission layer in operation caused by changes in emission layer thickness. The elimination layer is added to the panel and operated in phase opposition to the emission layer. Changes in layer thickness occurring in operation in the emission layer are offset by changes in thickness in the elimination layer. Thus, the overall thickness of the panel is constant.

12 Claims, 8 Drawing Sheets

ELECTROLUMINESCENT LIGHTING SYSTEM

BACKGROUND OF THE INVENTION

1. Field of the Invention

The inventions relate to electroluminescent lighting.

2. Brief Description of Related Developments

Electroluminescent panels are thin planar light emitting devices commonly employed to provide backlighting in a variety of the display applications, including for example laptop computers, personal digital assistants, wristwatches and a myriad of other electronic devices. One product for which electroluminescent panels are becoming increasingly prevalent is mobile phones. Generally, many of the mobile phones which are currently being produced have large backlit displays. The large displays allow a user to operate the telephone by selecting options from a displayed menu, or to receive and display data via a wireless Internet service.

Electroluminescent (EL) panels are now also being used to light up cover parts of the phone, e.g. for lighting up the rear cover for signaling or fun. Hereto, an EL panel (thin film panel) is placed under the phone cover. The EL panel typically comprises a plurality of panel regions, that can be activated separately or simultaneously. The panel regions can be different in shape and size an may form a pattern that can be used to create animations. Thus, lighting patterns can be formed that can be used to signal different information to a user.

A typical EL panel comprises a thin emission layer including an EL phosphor—a compound that emits light when excited by an electrical field—in a dielectric substrate disposed between two thin, electrically conductive electrode layers. At least one of these layers is optically transparent at the wavelength of the EL emission. By applying a high voltage across the two electrode layers, an electric field is induced between them. The phosphor is thereby excited to a higher energy state. When the electric field is removed, the atoms fall back to a lower energy state, emitting photons as visible light in the process.

Due to its structure—two conductive electrodes with a dielectric layer between them—the EL panel functionally behaves as a capacitor. The electric field induced by the applied voltage thus decreases as a charge accumulates on one of the electrodes, and correspondingly the light production of the phosphor is attenuated or the phosphor will at charge saturation conditions even cease to emit light.

Alternating current (AC) voltage must accordingly be applied to the electrodes of the EL panel to maintain continuous illumination. Typically, AC voltage in the frequency range of 300 Hz to 3000 Hz is used to drive EL panels.

In most applications, e.g. battery powered devices, the driver circuit for the EL panel is required to convert a low direct current battery voltage, such as 1.5, 3.0, 3.7 or 12 volts, into a voltage across the electrodes of the lamp that is 100-300 Volts or more, and having an alternating polarity.

Numerous circuits and systems exist within the prior art for driving EL panels from low voltage batteries. Typically, these driver circuits comprise an inverter incorporating inductors to step-up and convert the DC voltage to AC.

As previously mentioned, EL panels functionally behave as capacitors. The prior art EL panel driver circuits are designed to operate with one EL panel with a matching capacitance. As an EL panel ages, the capacitance of the lamp decreases, and without compensation, this decrease in capacitance causes the intensity of the panel to dim over time since the impendence of the drive circuit no longer matches the load.

U.S. Pat. No. 4,611,150 discloses a driver circuit including an inverter for driving an EL panel that compensates for changes in capacitance of the EL panel by voltage feedback and an oscillator being responsive to the feedback voltage to generate a time varying signal. Thus, capacitance changes caused by aging can be substantially compensated.

One of the problems with EL panels that comprise a plurality of panel regions is—as experienced by the inventors—emission intensity changes of lit panel regions when other panel regions are switched on or off. These intensity changes are perceived by observers as flaring. The panel regions can be of different size and correspondingly different capacitance. The capacitance of the load connected to the driver circuit varies therefore significantly when EL panel regions are switched on and off. The driver circuit disclosed in U.S. Pat. No. 4,611,150, that may partially reduce these undesired effects, is however complex, expensive and undesirable from an economic point of view in mass produced articles.

Another inherent problem with EL panels is that in operation, such devices emit acoustic energy within the audible range of sound waves, producing an associated objectionable buzz or hum. Specifically, the front electrode and rear electrode vibrate due to the fact that they are alternately attracted to each other (when an electric field is present) and relaxed (when the electric field is not present). Due to this vibration, air is displaced as the volume between the two electrodes is alternately compressed and then returned decompressed. This audible noise is particularly problematic in applications such as mobile phones, which in operation are held in very close proximity to the user's ear and in which any appreciable noise interferes with the use and operability of the device.

U.S. Pat. No. 5,789,870 discloses an approach to reducing the noise generated by EL panels. This patent describes a drive circuit, which predicts the transitions from positive to negative charge, and vice versa, and effectively damps these transitions. By increasing the rise and fall times of the voltage pulses applied to the electroluminescent lamp, the transitions of charge at the front and rear electrodes of the lamp are less abrupt. This in turn reduces the rate of physical deformation of the lamp electrodes resulting from opposite electrical charges, and reduces the audible output of the EL panel.

The solution described in U.S. Pat. No. 5,789,870, however, requires a complex electronic driving circuit, comprising a plurality of operational amplifiers, transistors, diodes, resistors, and capacitors. The component values of these circuit elements must be selected so as to operate properly at each desired frequency.

U.S. Pat. No. 6,563,271 discloses another approach to reduce the noise generated by EL panels. This patent describes a drive circuit for a lighting system with at least two panel regions and a driver circuit that is configured to alternately charge the electrodes of a first EL panel region while simultaneously discharging the electrodes of a second EL panel region and vice versa, preferably at the same rate. The noise produced by compression of the electrodes of the first EL panel region is thus cancelled by the noise created by the decompression of the electrodes of the second EL panel region, thereby substantially.

The solution described in U.S. Pat. No. 6,563,271, however, requires a complex electronic driving circuit, and is less useful for EL panels in which panel regions are selectively switched on and off, since the noise can only be canceled effectively if an even number of panel regions is active.

SUMMARY OF THE INVENTION

The inventions described below provide EL lighting systems for use in portable or mobile electric devices. In accordance with one embodiment, the present invention relates to a flare reducing lighting system comprising a driver circuit including a source of AC voltage and an electroluminescent panel with a plurality of panel regions configured to emit visible light when AC voltage is applied thereto. Each panel region has a given capacitance and is selectively connectable to the source of AC voltage. A substitute capacitor is associated with each panel region. The substitute capacitor has a capacitance that is substantially equal to the capacitance of the associated panel region and is connected to the source of AC voltage when the associated panel region is not connected to the source of AC power and vice versa. Thus, the capacitance of the load connected to the driver circuit does not substantially vary when EL panel regions are switched on and off. An exact match in capacitance between the EL panel section and the substitute capacitor is not required to reduce the flaring problem.

The driver circuit may comprise a plurality of current flow control devices coupled to the electrodes of the panel regions and to the substitute electrodes. The current flow control devices preferably comprise switches that alternately connect the panel sections and the associated substitute capacitors with the voltage source.

The driver circuit may further comprise a controller configured to control the current flow control devices.

The panel regions and the substitute capacitors are preferably formed in a single thin film. By forming the substitute capacitors in the same film as the panel region, a compact, and production friendly construction is obtained. If similar dielectric materials are selected for both the emission and the layer forming the substitute capacitor the substitute capacitor is automatically closely matched to the capacitance of the panel region.

In accordance with another embodiment, the present invention relates to a noise reduced lighting system comprising an EL panel configured to emit visible light when AC voltage is applied thereto. The EL panel comprises an upper emission layer between two electrodes and a lower elimination layer between two electrodes. The system comprises a driver circuit that includes a voltage supply source for supplying AC voltage to the electrodes with the emission layer in between and for supplying AC voltage in phase opposition to the electrodes with the elimination layer in between.

The emission layer is compressed when the electrodes with the emission layer there between are charged and the emission layer is decompressed when the electrodes with the lighting layer there between are discharged. The same applies to the elimination layer. The rate of compression of emission layer upon charging is preferably substantially equal to the rate of decompression of the lower elimination layer upon discharging and vice versa. Simultaneous compression and decompression of the emission layer and the elimination layer substantially offset one another's changes in thickness. The emission layer and the elimination layer are operated in opposite phase and the resulting changes in layer thickness compensate one another. Thus, the overall thickness of the active panel remains substantially constant and virtually no noise is produced by the operating panel.

The lighting systems of the previously summarized embodiments may be combined in a further embodiment that resolves both the flaring and the noise problems. This EL lighting system with a plurality of panel regions with a given capacitance comprises further to the elimination layer a substitute capacitor associated with each panel region. The substitute capacitor has a capacitance that is substantially equal to the capacitance of the associated panel. The substitute capacitor is connected to the source of AC voltage when the associated panel region is not connected to the source of AC power and vice versa.

Further objects, features, advantages and properties of the lighting system according to the inventions will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE PREFERRED EMBODIMENT(S)

The EL panels according to the present invention can advantageously be used in combination with mobile communication terminals. Such a terminal in the form of a hand portable phone, preferably a cellular/mobile phone, will be described hereafter.

Figure 1:
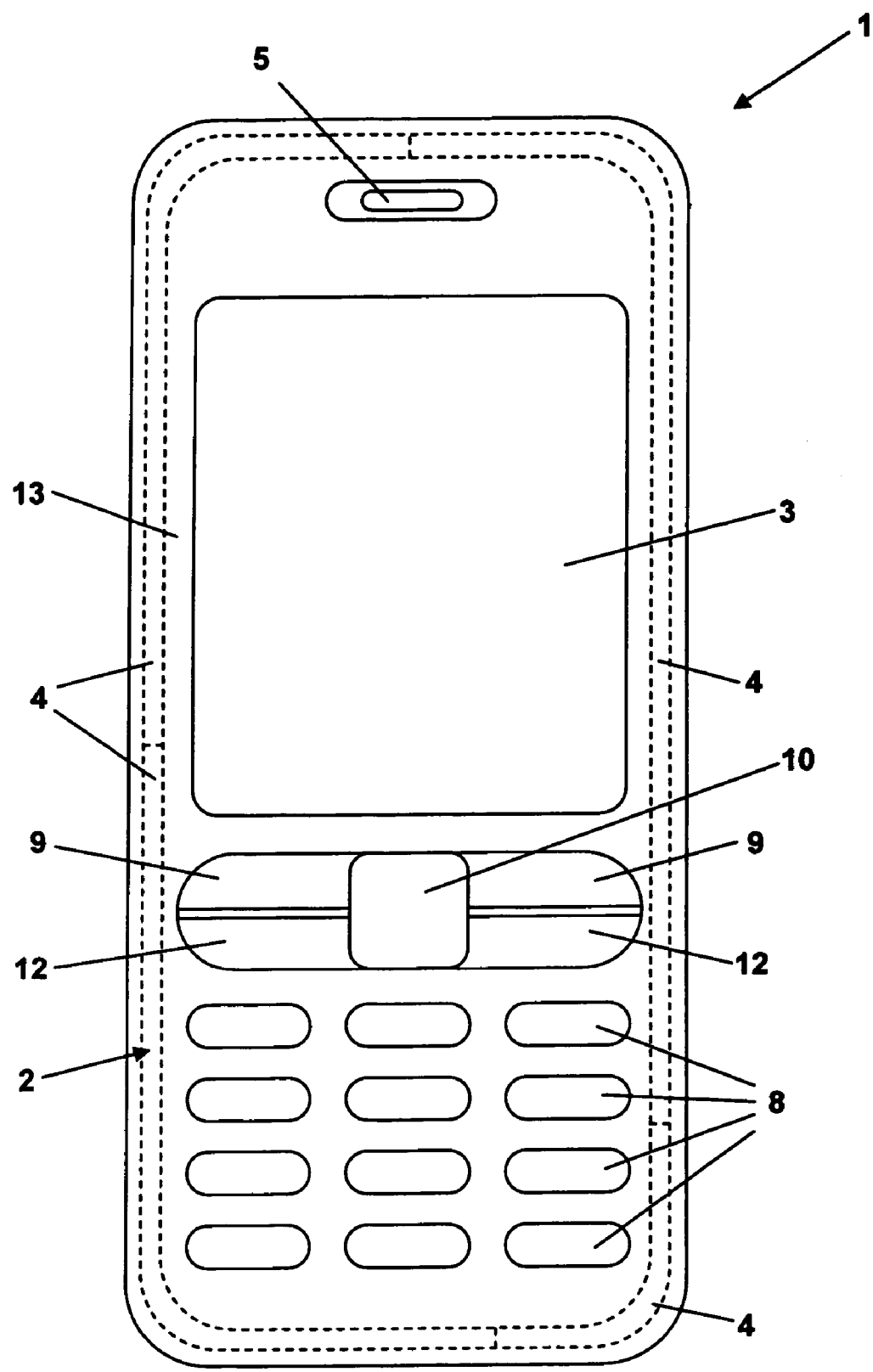
FIG. 1 is a frontal view of a mobile phone in which an EL panel with a plurality of panel regions is used to backlit the display.

FIG. 1 shows a mobile phone according to the invention. The phone 1 comprises a user interface having a keypad 2, a display 3, an on/off button (placed on top, not shown), a speaker 5 (only the openings are shown), and a microphone 6 (not shown, opening for the microphone is placed on the bottom of the phone). The phone 1 according to the preferred embodiment is adapted for communication via a cellular network, such as the GSM 900/1800/1900 MHz of the G3 network.

The keypad 2 has a first group of keys 8 as alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key 8 is associated with a number of letters and special signs used in the text editing.

The keypad 2 has additionally a second group of keys comprising two soft-keys 9, two call handling keys 12, and a navigation key 10. The function of the soft-keys depends on the state of the phone 1 and navigation in the menu can be performed by using the navigation-key 10. The present function of the softkeys 9 is shown in separate fields (soft labels) in the display 3, just above keys 9. The two call handling keys 12 are used for establishing a call or a conference call, terminating a call or rejecting an incoming call. This key layout is characteristic for e.g. the Nokia 6610™ phone.

The navigation key 10 is a four-way key which can be used for cursor movement and scrolling and is placed centrally on the front surface of the phone 1 between the display 3 and the group of alphanumeric keys 8. The phone 1 is provided with exchangeable and semi transparent front and rear covers 13,14.

The phone 1 has a flat display 3 that is typically formed by an LCD such as a TFT matrix capable of displaying color images.

Figure 2:
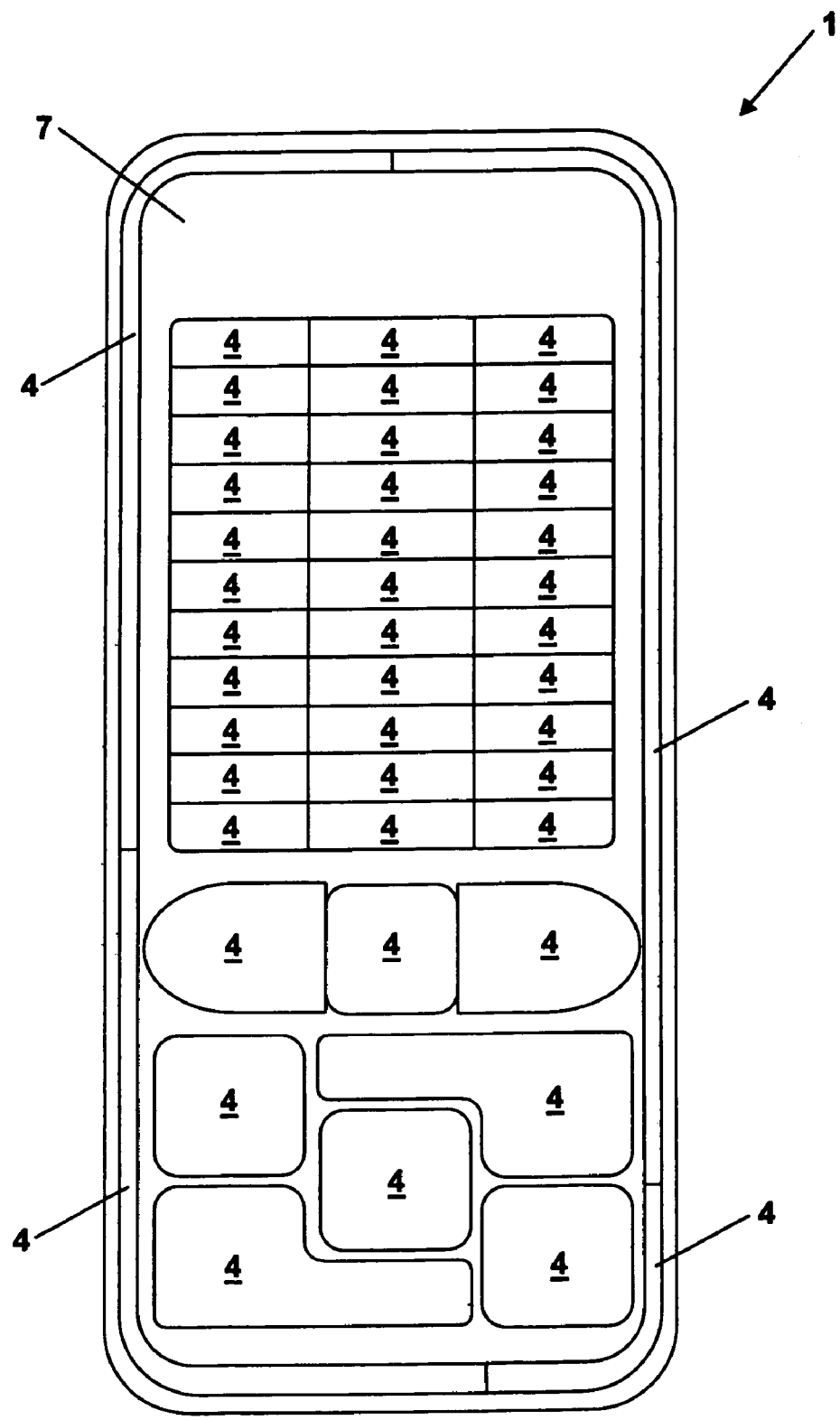
FIG. 2 is a view of the front of a mobile phone of FIG. 1 with the front cover removed to allow the EL panel to be viewed.

FIG. 2 shows the phone 1 with the front cover 13 and the display 1 removed so that the front EL panel 7, that is formed by a thin film EL panel can be viewed. The EL panel 7 comprises a plurality of panel regions 4 that can be switched on and off individually. The area of the EL panel 7 that serves to backlight the display 3 is divided in a number of panel regions 4, so that parts of the display 3 can be individually highlighted to e.g. attract a user's attention to certain parts of the display 3. Other parts of the EL panel 7 on the circumference of the front of the phone 1 and under the keys 8,9,10,12 can also be individually lit. The panel regions 4 on the circumference of the front of the phone 1 can be used to signal incoming messages or calls to the user. The panel regions 4 under the keys 8,9,10,12 can be used to guide the user by e.g. suggesting/indicating which keys could be pressed next. Of course these panel regions 4 also serve their conventional function for backlighting the display 3 and the keys 8,9,10,12 in a conventional manner. The panel regions 4 can be of a multicolor, or monochrome type, with or without different colors for different panel regions. It is also possible to combine different lighting sources with the EL panels 7,11, e.g. LEDs with or without light guides can be used for backlighting the keys 8,9,10,12.

Figure 3:
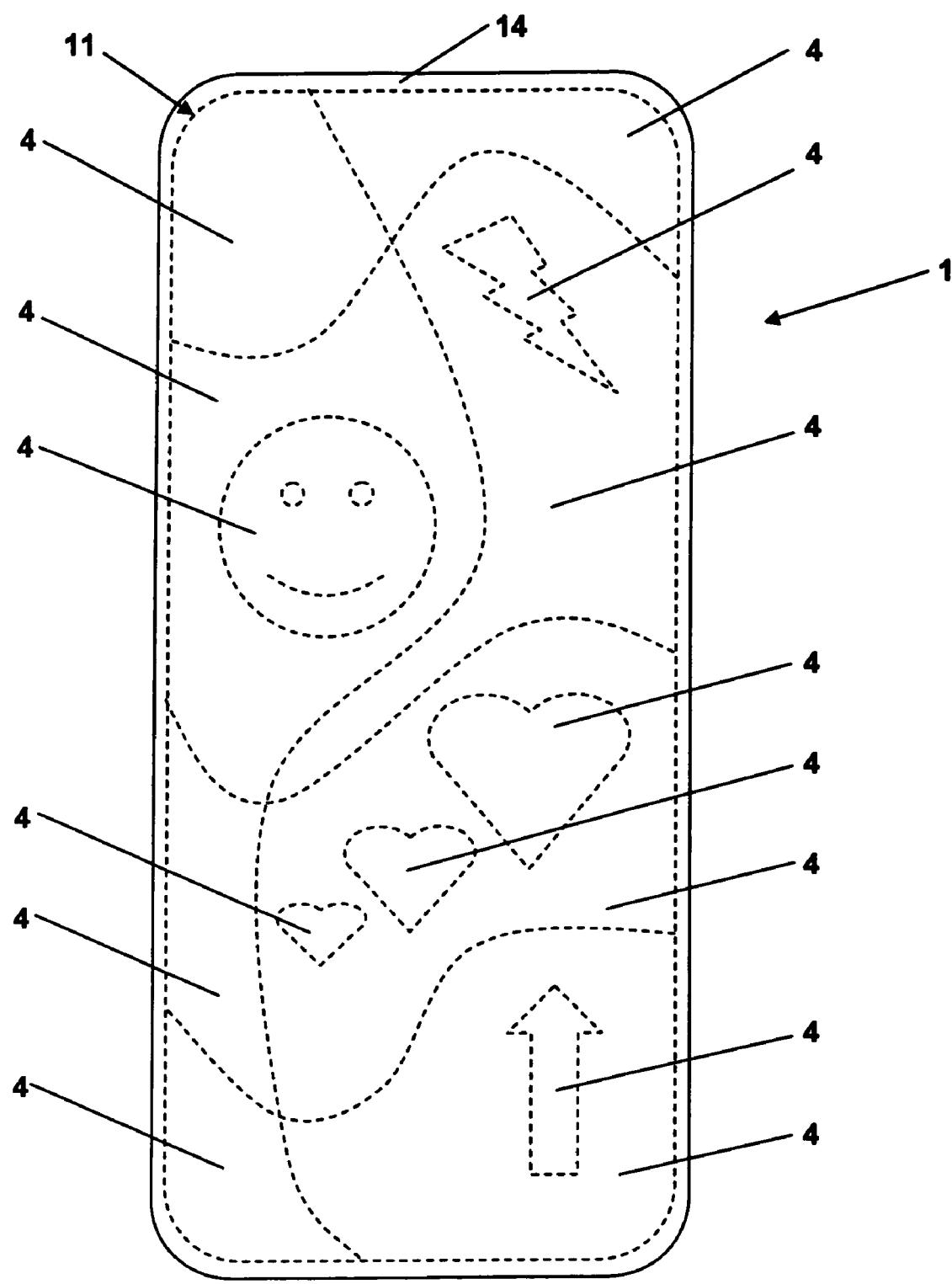
FIG. 3 is a view of the rear of the phone of FIG. 1.

FIG. 3 shows the phone 1 from the rear. The rear side of the phone is provided with a transparent or eventually semi-transparent rear cover 14. Under the rear cover 14 a rear EL panel 11 (depicted by the interrupted lines) with a plurality of panel regions 4 is arranged to assist in signaling or for fun/amusement purposes. Any number of panel regions 4 may be employed, and the regions may meet each other along straight lines, and interlaced pattern, a checkerboard pattern or any other conceivable pattern. Regardless of the pattern which is created by panel regions, the systems according to the present inventions allow for flare reduction and noise cancellation, respectively or simultaneously.

Figure 4:
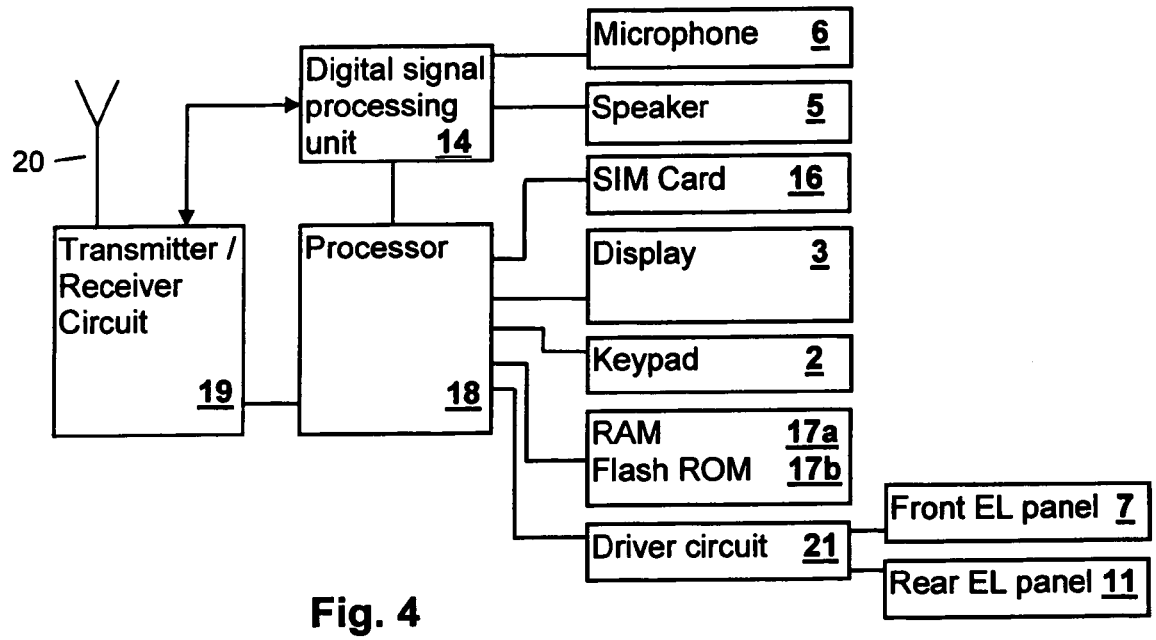
FIG. 4 is a block diagram of the essential components of a mobile phone according to the invention.

FIG. 4 schematically shows the most important parts of a preferred embodiment of the phone 1, in the form of a block diagram. A processor 18 controls the communication with the cellular network via the transmitter/receiver circuit 19 and an internal antenna 20. A microphone 6 transforms the user's speech into analogue signals, the analogue signals formed thereby are A/D converted in an A/D converter (not shown) before the speech is encoded in a digital signal processing unit 14 (DSP). The encoded speech signal is transferred to the processor 18, which i.e. supports the GSM terminal software. The processor 18 also forms the interface to the peripheral units of the apparatus, including a RAM memory 17a and a Flash ROM memory 17b, a SIM card 16, the display 3, the EL driver circuit 21 and keypad 2 (as well as data, power supply, etc.). The digital signal-processing unit 14 speech-decodes the signal, which is transferred from the processor 18 to the earpiece 5 via a D/A converter (not shown). The EL driver circuit 21 which will be described in more detail below is connected to the front EL panel 7 and the rear EL panel 11.

Figure 5:
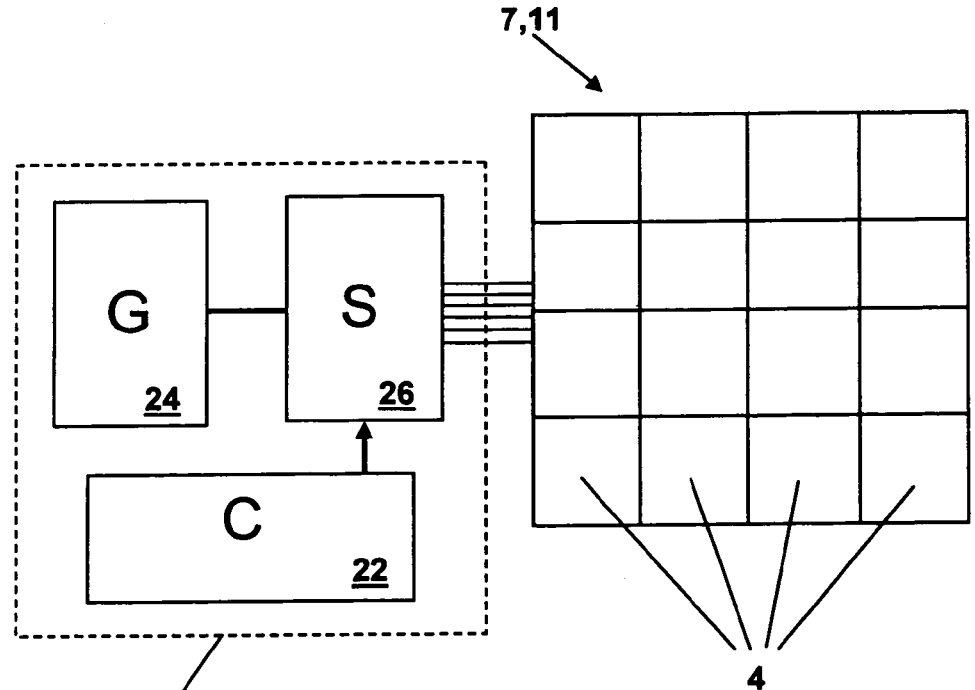
FIG. 5 is a block diagram of a driver circuit.

FIG. 5 shows a block diagram of the components of the driver circuit 21. A step-up converter circuit 24 provides high AC voltage. The converter circuit 24 is connected to the EL front and rear panel 7,11 via a switching unit C that comprises a plurality of switches 26. Each of the switches is connected to a respective panel section 4. The switches are controlled by a controller 22, which receives its instructions from the processor 18. Alternatively, the switches 26 can be controlled directly by the processor 18. The switching unit S is connected to the EL panels 7,11 via a zero force insertion connector 63,64 that is described in more detail below.

Figure 6:
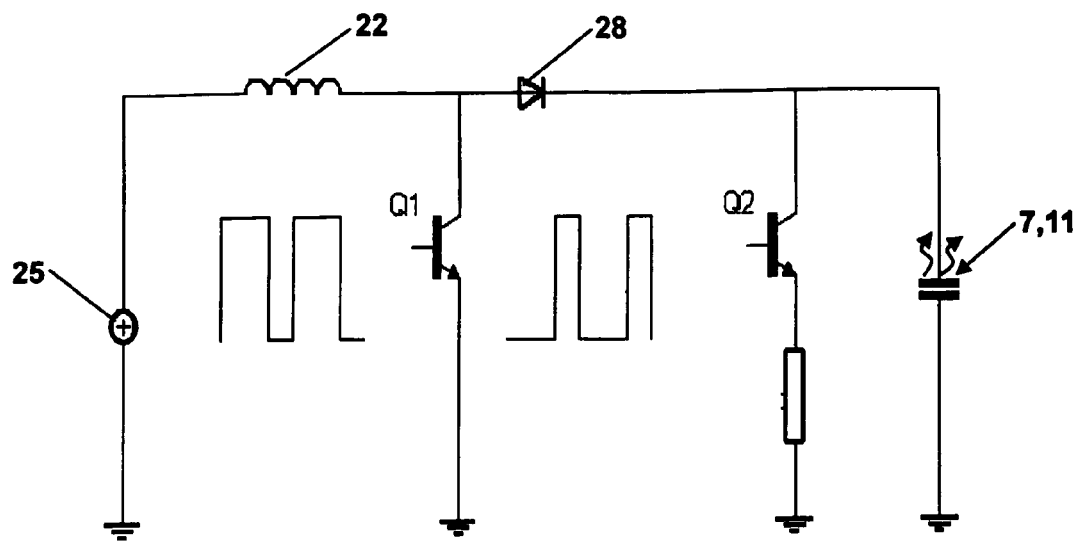
FIG. 6 is a circuit diagram of a step-up converter.

FIG. 6 shows in more detail the conventional step-up converter circuit 24, which is powered by the battery of the phone 1. The circuit includes a coil 22 and two NPN transistors Q1 and Q2. The EL panels 7,11 are diagrammatically represented in FIG. 6 as a capacitor. For the sake of simplicity the switching unit S has been omitted in FIG. 6 and the plurality of panel regions 4 is represented as by a single capacitor.

Transistor Q1 is in opposition phase to transistor Q2 driven with a pulse width modulated signal from the processor 18 whose pulse ratio is 90%. This means coil 22 is charged 90% of the time and 10% of the time charged energy is released to EL panel region. The maximum voltage across the panel region can reach about 300 V. After charging the capacitance (EL panel) is discharged with transistor Q2 and the sequence is started again.

Figure 7:
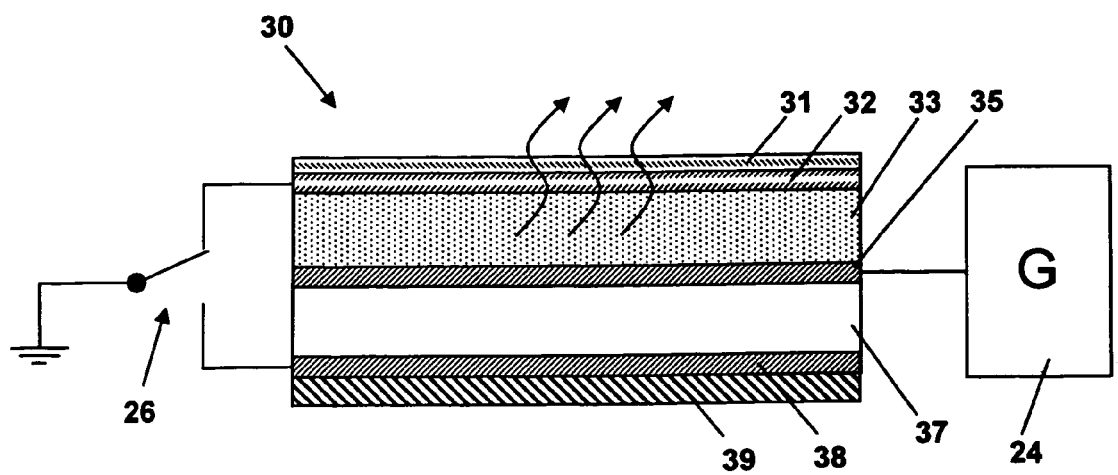
FIG. 7 is a schematic sectional view of the electroluminescent panel according to a first embodiment of the invention.

FIG. 7 is a cross-sectional view of a thin film EL panel 30 and a diagrammatically represented driver circuit according to an embodiment directed to avoiding flaring of panel regions. The EL panel 30 can be used for forming a stand alone EL panel or for one or more of the panel regions 4 of the EL panels 7,11.

Disposed between a transparent front protective cover 31 and a rear protective cover 39 is a transparent electrode 32, an emission layer 33, a second electrode 35, a substitute capacitor layer 37 and a rear electrode 38.

The transparent front electrode 32 can be made of conductive tin doped indium oxide deposited on a transparent PET film. Other materials for the transparent electrode 32 can also be used.

The active element in the emission layer 33 is an EL phosphor. Any common EL phosphors (compounds that are capable of emitting radiation in the visible and/or ultraviolet spectrums upon excitation of the material by an external energy source) can be used for the EL panel according to the present invention. Typically, the EL phosphor comprises Zink sulfide (ZnS) as base material with copper or manganese as an activator (ZnS:Mn or ZnS:Cu). Different co-activators such as chlorine, bromine, iodine and aluminum can be used. The EL phosphor is dispersed in a binder such as a dielectric polymer binder. The dielectric polymer binder with the EL phosphor therein is generally applied by vapor deposition techniques.

The substitute capacitor layer 37 should have substantially the same capacitance value as the emission layer 33 for optimum flare reduction. The substitute capacitor layer 37 is therefore preferably made from the same dielectric material as the dielectric binder of the emission layer 33 and also has the same thickness. The substitute capacitor layer 37 may be formed by a dielectric layer with or without an EL phosphor dispersed therein. An EL phosphor is not required, but if it is advantageous from a production point of view, the two layers 33,37 can be completely identical.

The transparent front electrode 32 and the rear electrode 38 are alternately connected to earth via switch 26. The switch 26 is controlled by the controller 22 in the driver circuit 21. The second electrode 35 is connected to the step-up converter circuit 24. The voltage level can be in the range of 100 to 300 V and the frequency in the range of 80 to 300 Hz, depending on the selected materials and dimensions of the EL panel.

When the switch 26 connects the front electrode 32 to earth, the alternately charged and discharged middle electrode 35 causes the photons in the emission layer 33 to be alternately exited and unexcited, causing visible light to be emitted from the emission layer 33. The visible light is allowed to leave the emission layer 33 through the transparent electrode 32 and the transparent front protective cover 31.

When the switch 26 connects the rear electrode 38 to earth, the alternately charged and discharged middle electrode 35 causes the photons in the substitute capacitor layer 37 to be alternately exited and unexcited. Depending on the presence of EL phosphor in the dielectric the substitute capacitor layer 37 emits visible light or not, but since the substitute capacitor layer is encapsulated by two non-transparent electrodes 35,38 no visible light will leave the EL panel in.

The light emission layer 33 together with the transparent front electrode 32 and the second electrode 35 act substantially as capacitors. The substitute capacitor layer 37 has the same capacitance as the emission layer 33. Thus, when the controller 22 causes the switch 26 to connect alternately to the front electrode 32 to activate the emission layer 33 and to rear electrode 38 to activate the substitute capacitor, the capacitance of the load on the step-up converter 24 remains constant.

The panel regions 4 of the EL panels 7,11 can be formed with a substitute capacitance. The substitute capacitance can be an integral part of the panel, such as described above with reference to EL panel. Alternatively, the substitute capacitance can be arranged separately from the EL panel section concerned, e.g. in the driver circuit 21. In an EL panel 7,11 with a plurality of panel regions 4 that have a substitute capacitance between which is switched in order to activate and deactivate the panel regions concerned the capacitance of the load on the driver circuit 21 remains constant. Thus, when a first panel region 4 is permanently active, while a second panel region 4 is switched on and off, the AC voltage delivered by the conventional driver circuit 21 will remain stable, without the need for a voltage feedback regulated driver circuit because the capacitance load on the driver circuit remains stable. Thus, the first panel region will not flare.

Figure 8A:
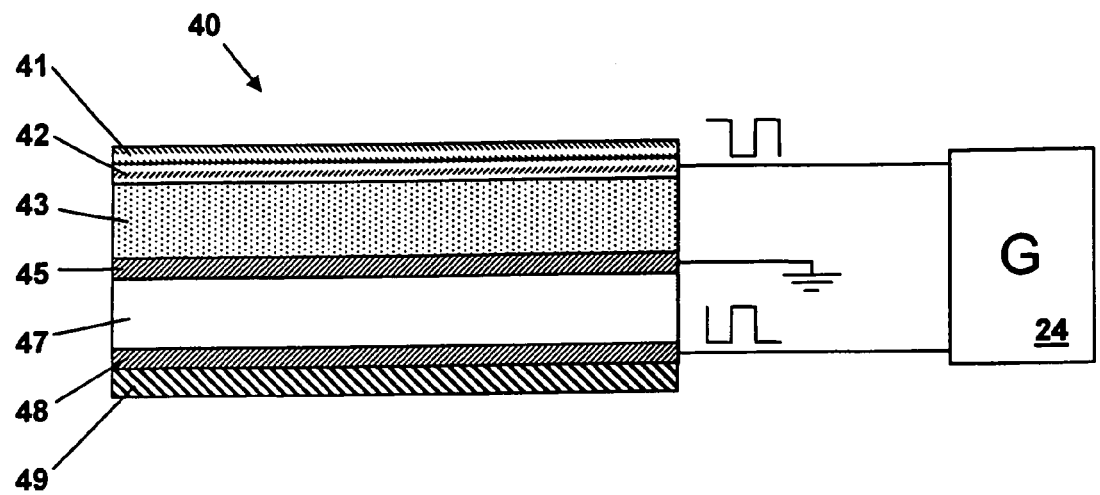
FIGS. 8*a*, 8*b*, 8*c* are schematic sectional views of the electroluminescent panel according to a second embodiment of the invention.

FIG. 8a is a cross-sectional view of a thin film EL panel 40 and a diagrammatically represented driver circuit according to an embodiment directed to reducing noise that is produced by conventional EL panels. The EL panel 40, can be used for forming a stand alone EL panel or for one or more of the panel regions 4 of the EL panels 7,11.

Disposed between a transparent front protective cover 41 and a rear protective cover 49 is a transparent electrode 42, an emission layer 43, a second electrode 45, a noise elimination layer 47 and a rear electrode 48.

The transparent front electrode 41 can be made of conductive tin doped indium oxide deposited on a transparent PET film. Other materials for the transparent electrode 42 can also be used.

3 The front electrode 42 and the rear electrode are charged with AC voltage from the step-up converter circuit 24. The voltage level can be in the range of 100 to 300 V and the frequency in the range of 80 to 300 Hz, depending on the selected materials and dimensions of the EL panel. In this embodiment the step-up converter circuit 24 is slightly modified so that it can provide two AC voltages of the same voltage level and frequency but in phase opposition to one another.

The front electrode 42 is charged with one of the AC voltages from the step-up converter circuit 24, while the rear electrode 48 is charged with AC voltage that is in phase opposition thereto.

The second electrode 45, is connected to earth. The connection to the generator may be switched on and off (not shown) to activate and deactivate the EL panel 40.

The active element in the emission layer 43 is an EL phosphor dispersed in a polymeric dielectric binder, as described above for layer 33 of the previously described embodiment.

The elimination layer 47 should have substantially the same characteristics as the emission layer 43, so that the changes in thickness of the two layers 43,47 in response to the forces applied thereto by the charged electrodes 42,45,48 are equal in both layers. The simplest way to obtain the same characteristics is by an elimination layer 47 that is identical to the emission layer 43, i.e. the same dielectric material and thickness. The EL phosphor can be omitted from the elimination layer 47, but if the EL phosphor is included in the elimination layer it can also produce visible light. By providing a transparent rear electrode 48 and protective rear cover 49, the thus formed EL panel produces light on both front and rear side. Alternatively, the middle electrode 45 is rendered transparent and the light emitted by the elimination layer 47 leaves the EL panel 40 through the transparent second electrode 45, the emission layer 43, the transparent front electrode 42 and the transparent front protective cover 41.

When the front and rear electrodes 42,48 are alternately charged in phase opposition the photons in the emission layer 43 and eventually in the elimination layer 47 are alternately exited and unexcited, causing visible light to be emitted from the emission layer 43 and eventually from the elimination layer 47 too. The visible light is allowed to leave the emission layer through the transparent electrode 42 and the transparent front protective cover 41, and from the elimination layer 47 as previously described.

Figure 8B:
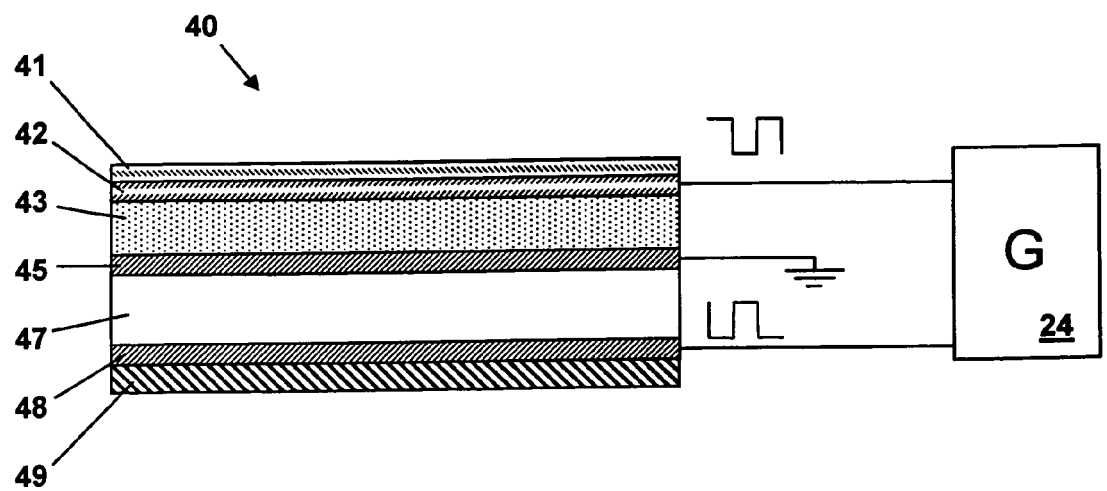
Figure 8C:
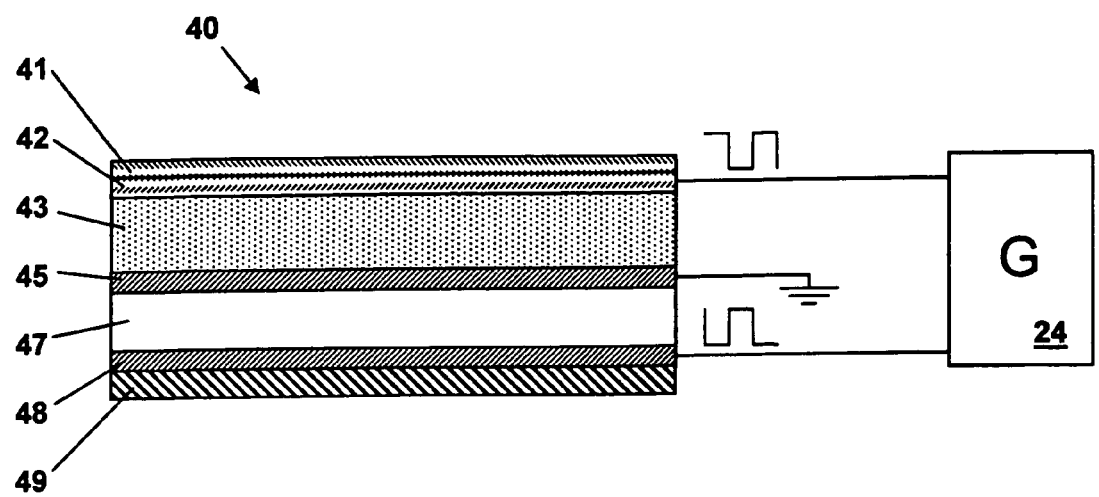

The alternately charged front electrode 42 is alternately attracted towards the middle electrode 45, and thereby alternately compresses and decompresses the emission layer 43. The alternately charged rear electrode 48 is alternately attracted towards the middle electrode 45, and thereby, alternately compresses and decompresses the elimination layer 47. Since the front electrode 42 and the rear electrode 48 are charged in phase opposition, a compression of the emission layer 43 is offset by decompression of the elimination layer 47 and vice versa. Thus, the overall thickness of the EL panel 40 remains substantially constant when the panel is active, as illustrated in FIGS. 8b and 8c. FIG. 8b shows the EL panel 40 with the emission layer active and compressed. FIG. 8c shows the EL panel 40 with the elimination layer active and compressed. The changes in individual layer thickness as depicted are exaggerated for illustrative purposes, in reality the change in layer thickness is relatively small. The overall thickness of the active EL panel 40 is slightly less than the thickness of the inactive EL panel 40 since always one of the layers 43,47 is compressed in when the EL panel 40 is active.

Because the overall thickness of the EL panel 40 remains constant in operation practically no noise is produced, which renders the EL panel 40 particularly suitable for applications that are used close to the ear or in very quite environments, such as reading rooms or bedrooms.

The panel regions 4 of the EL panels 7,11 can be formed with an elimination layer. The elimination layer can be completely identical with the emission layer, and be with or without EL phosphor. Alternatively, it is also possible to obtain the opposite change in layer thickness by having a thinner or stiffer elimination layer while applying a higher voltage phase opposite charge.

The panel 40 can also be provided with further elimination layers and further emission layers in between transparent electrodes (not shown). Thus, a panel with e.g. two emission layers and eventually two light emitting elimination layers can be obtained. Such a panel is able to provide a higher brightness and/or a higher number of different colors in which the panel can light.

Figure 9:
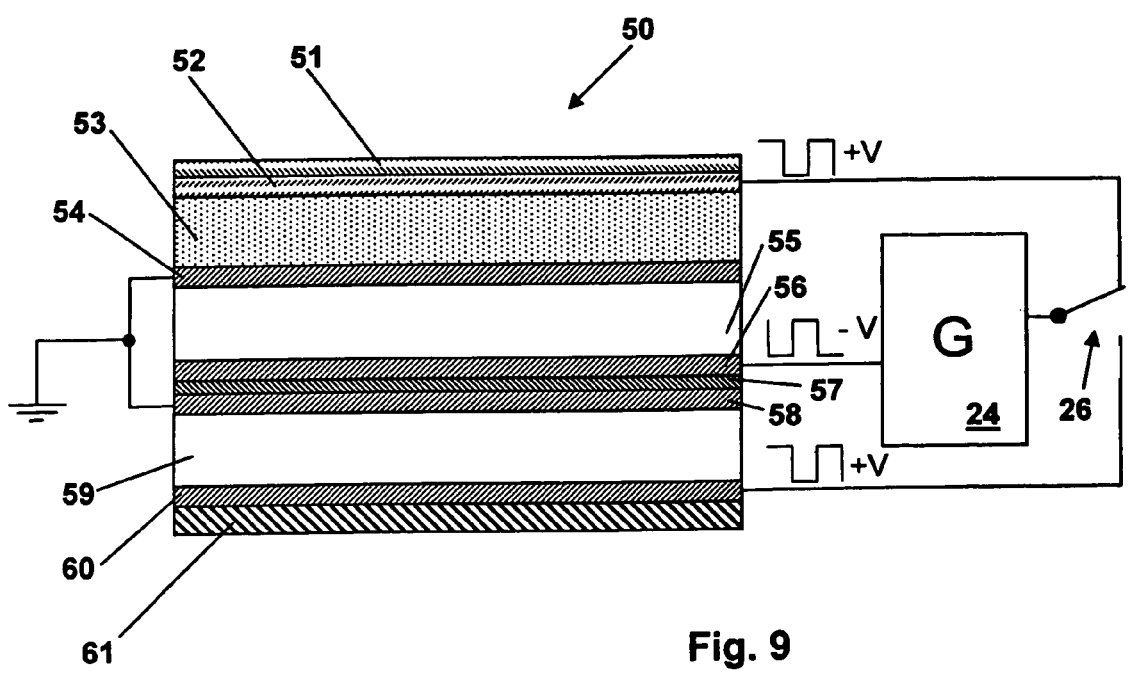
FIG. 9 is a schematic sectional view of the electroluminescent panel according to a third embodiment of the invention including a schematically represented driver circuit.

FIG. 9 is a cross-sectional view of a thin film EL panel 50 and diagrammatically represented driver circuit according to another embodiment directed to reducing both flaring and noise. The EL panel 50, can be used for forming a stand alone the EL panel or for one or more of the panel regions 4 of the EL panels 7,11.

Disposed between a transparent front protective cover 51 and a rear protective cover 61 is a transparent electrode 52, an emission layer 53, a second electrode 54, a noise elimination layer 55, a third electrode 56, an isolation layer 57, a fourth electrode 58, a substitute capacitor layer 59 and a rear electrode 60.

The transparent front electrode 52, the emission layer 53, the second electrode 54, the elimination layer 55, and third the electrode 56 are identical with the corresponding layers of the noise canceling EL panel 40 described above.

The front electrode 52 and the third electrode 56 are charged in phase opposition, whilst the second electrode 54 is connected to earth. The front electrode 42 and the rear electrode 60 are charged with AC voltage from the step-up converter circuit 24. The voltage level could be in the range of 100 to 300 V and the frequency in the range of 80 to 300 Hz, depending on the selected materials and dimensions of the EL panel. In this embodiment the step-up converter circuit 24 is capable of providing two AC voltages of the same voltage level and frequency but in phase opposition to one another.

The substitute capacitor layer 59 is placed between the fourth electrode 58 and the rear electrode 60, and is substantially identical to the corresponding substitute capacitor layer 37 of the flare reducing EL panel 30 described above. The fourth electrode 58 is connected to earth and isolated from the third electrode 56 by an isolation layer 57. The front electrode 52 and the rear electrode 60 are alternately connected via switch 26 to the step-up converter circuit 24. The switch 26 is controlled by the controller 22 in the driver circuit 21. Thus, either the emission layer 52 or the substitute capacitance layer 59 is charged by the step-up converter circuit 24. The elimination layer 55 is always charged by the step-up converter circuit 24 when the panel is in operation. The capacitance of the load on the step-up converter circuit 24 is thus constant, and there is no flaring when panel regions 4 that are formed by EL panels 50 are switched on and off when other panel regions 4 are permanently active, even with a non-voltage feedback compensated AC voltage source such as a battery powered step-up converter 24.

The elimination later 55 is always active when the EL layer 50 is switched on, and because the elimination layer 50 is charged in phase opposition to both the emission layer 52 and the substitute capacitor layer 59 the changes in thickness of the respective layers offset one another so that the overall thickness of the active EL panel 50 is constant in a manner analogous to the EL panel 40 previously described.

Because the overall thickness of the panel 50 remains constant in operation practically no noise is produced, which renders the EL panel 50 particularly suitable for applications that are used close to the ear or in very quite environments, such as reading rooms or bedrooms.

The panel regions 4 of the EL panels 7,11 can be formed with both an elimination layer and a substitute capacitance layer, to obtain an EL panel 7,11 that is quite and does not flare.

Figure 10:
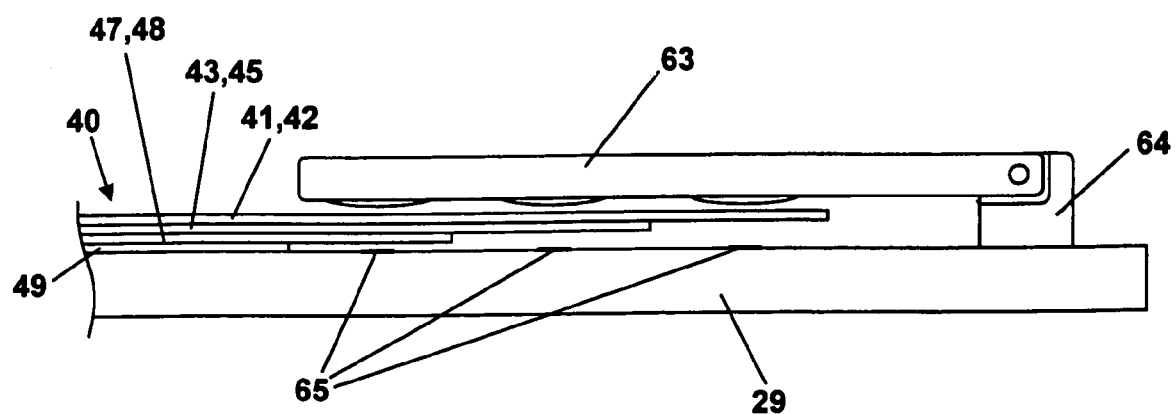
FIG. 10 is a sectional view through a connector that clamps the electroluminescent panel onto the PCB.

FIG. 10 illustrates diagrammatically a zero insertion force connector 63,64 that connects the EL panel—in this figure illustrated with EL panel 40—to the printed circuit board 29 (PCB) of the phone 1. The EL panels are represented in a simplified manner by illustrating several individual layers and electrodes in combination as one layer in FIG. 10 for the sake of simplicity.

The top surface of the PCB 29 is provided with a number of elongated contact strips 65 corresponding to the number of electrodes in the EL panel. The EL panel 40 has three electrodes and therefore three elongated contacts 65 are shown in FIG. 10. The peripheral area of the EL panel 40 at the connector area has been stripped layer by layer in a stepped manner to expose the electrodes 42,45,48.

When the zero insertion force connector is closed, the clamping element 63 deforms by means not shown but well known in the art to press the electrodes 42,43,48 onto the respective contacts 65.

Thus, while the preferred embodiments of the devices and methods have been described in reference to the environment in which they were developed, they are merely illustrative of the principles of the inventions. Other embodiments and configurations may be devised without departing from the scope of the appended claims.

Although the present invention has been described in detail for purpose of illustration, it is understood that such detail is solely for that purpose, and variations can be made therein by those skilled in the art without departing from the scope of the invention.

What is claimed is:

1. A lighting system comprising:
    a driver circuit including a source of AC voltage,
    an electroluminescent panel with a plurality of panel regions configured to emit visible light when AC voltage is applied thereto,
    each panel region having a given capacitance and being selectively connectable to the source of AC voltage, wherein each panel region is configured to maintain a substantially constant capacitance load on the source of AC voltage,
    a substitute capacitor layer associated with each panel region, the substitute capacitor layer having a capacitance that is substantially equal to the capacitance of the associated panel region, the substitute capacitor layer being connected to the source of AC voltage when the associated panel region is not connected to the source of AC power and vice versa.

2. The lighting system according to claim 1, wherein the driver circuit comprises a plurality of current flow control devices coupled to the electrodes of the panel regions and to the electrodes of the substitute capacitor layer.

3. The lighting system according to claim 2, wherein the current flow control devices comprise switches that alternately charge the panel sections and the associated substitute capacitor layer.

4. The lighting system according to claim 1, wherein the driver circuit further comprises a controller configured to control the current flow control devices.

5. The lighting system according to claim 1, wherein the panel regions and the substitute capacitors layer are formed in a single thin film.

6. The lighting system according to claim 5, wherein the panel regions comprise;
an emission layer between a transparent front electrode and a second electrode, and
the substitute capacitor layer is between the second electrode and a rear electrode.

7. The lighting system according to claim 1, wherein the AC voltage source is a battery driven step up converter.

8. A thin film electroluminescent panel comprising;
an emission layer arranged in between a transparent front electrode and a second electrode,
a substitute capacitor layer arranged between the second electrode and a rear electrode, the substitute capacitor layer having a capacitance that is substantially equal to a capacitance of the panel, and a source of AC voltage connected to the substitute capacitor, the source of AC voltage being connected to the substitute capacitor when the panel is not connected to the source of AC power and vice versa.

9. The thin film electroluminescent panel according to claim 8, wherein the substitute capacitor layer and the emission layer are formed by one and the same electrolytic material.

10. The thin film electroluminescent panel according to claim 8, wherein the electroluminescent panel comprises a plurality of panel regions each having an emission layer and a substitute capacitor layer, each panel region having a given capacitance and being selectively connectable to the source of AC voltage,
a substitute capacitor associated with each panel region, the substitute capacitor having a capacitance that is substantially equal to the capacitance of the associated panel region,
the substitute capacitor being connected to the source of AC voltage when the associated panel region is not connected to the source of AC power and vice versa.

11. The thin film electroluminescent panel of claim 8 further comprising a switch alternately connected between the transparent front electrode and ground, and the rear electrode and ground.

12. A lighting system comprising:
a driver circuit including a source of AC voltage;
an electroluminescent panel region configured to emit visible light when AC voltage is applied thereto;
the panel region having a given capacitance and being selectively connectable to the source of AC voltage, wherein the panel region is configured to maintain a substantially constant capacitance load on the source of AC voltage,;
a substitute capacitor associated with the panel region, the substitute capacitor having a capacitance that is substantially equal to the capacitance of the panel region;
the substitute capacitor being connected to the source of AC voltage when the panel region is not connected to the source of AC power and vice versa.

* * * * *